(12) United States Patent
Cooper et al.

(10) Patent No.: US 7,895,172 B2
(45) Date of Patent: Feb. 22, 2011

(54) SYSTEM AND METHOD FOR WRITING DATA DEPENDENT UPON MULTIPLE READS IN A DISTRIBUTED DATABASE

(75) Inventors: Brian Cooper, San Jose, CA (US); Utkarsh Srivastava, Fremont, CA (US); Ramana V. Yerneni, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 390 days.

(21) Appl. No.: 12/070,604

(22) Filed: Feb. 19, 2008

(65) Prior Publication Data

US 2009/0210428 A1 Aug. 20, 2009

(51) Int. Cl.
*G06F 7/00* (2006.01)
*G06F 17/00* (2006.01)

(52) U.S. Cl. .................. 707/704; 707/713; 707/770; 709/224; 709/225; 709/226

(58) Field of Classification Search .............. 707/611, 707/613, 620, 704, 713, 770; 709/224, 225, 709/226
See application file for complete search history.

(56) References Cited

U.S. PATENT DOCUMENTS

| | | | | |
|---|---|---|---|---|
| 5,355,477 A | * | 10/1994 | Strickland et al. ........... | 707/704 |
| 5,546,579 A | * | 8/1996 | Josten et al. ................ | 707/204 |
| 5,826,253 A | * | 10/1998 | Bredenberg .................. | 707/10 |
| 6,434,568 B1 | * | 8/2002 | Bowman-Amuah ........... | 707/10 |
| 6,446,092 B1 | * | 9/2002 | Sutter ......................... | 707/10 |
| 6,539,396 B1 | * | 3/2003 | Bowman-Amuah ........... | 707/10 |
| 6,640,244 B1 | * | 10/2003 | Bowman-Amuah .......... | 709/207 |
| 7,047,243 B2 | * | 5/2006 | Cabrera et al. ............... | 707/10 |
| 7,076,508 B2 | * | 7/2006 | Bourbonnais et al. ........ | 707/204 |
| 7,099,889 B2 | * | 8/2006 | Berks et al. ................. | 707/704 |
| 7,103,589 B1 | * | 9/2006 | Kepler et al. ................ | 707/204 |
| 7,171,410 B1 | * | 1/2007 | Neufeld et al. .............. | 709/225 |

(Continued)

OTHER PUBLICATIONS

McCloskey et al.—"Autolocker: Synchronization Inference for Atomic Sections" —conference record of the $33^{rd}$ ACM SIGPLAN-SIGACT symposium on Principles of programming Languages—Jan. 11-13, 2006 (pp. 346-358).*
Kenneth P. Birman—"Replication and Fault-Tolerance in the ISIS System" —Proceedings of the tenth ACM symposium on Operating Systems principles—1985 ACM—(pp. 79-86).*
Alexander Thomasian—"Distributed Optimistic Concurrency Control Methods for High Performance transaction Processing" Knowledge and data Engineering, IEEE Transaction on, Jan./Feb. 1998 IEEE (pp. 173-189).*

*Primary Examiner*—John E Breene
*Assistant Examiner*—Anh Ly
(74) *Attorney, Agent, or Firm*—Law Office of Robert O. Bolan (57) ABSTRACT

An improved system and method for writing data dependent upon multiple reads in a distributed database is provided. A client may read several data records and may then send a request to a database server to perform a transaction to write a data record dependent upon multiple data records read. A database server may receive the request specifying a transaction to write a data record dependent upon multiple data records read and may perform the transaction by latching a master data record to be written and validating the data records the write depends upon. The multiple data records upon which the write depends may be validated by verifying the multiple data records are current versions of the data records stored in the distributed database. Data intensive applications may use this transaction type in large scale distributed database systems to provide stronger consistency without significantly degrading performance and scalability.

18 Claims, 5 Drawing Sheets

U.S. PATENT DOCUMENTS

| | | | |
|---|---|---|---|
| 7,206,805 B1 * | 4/2007 | McLaughlin, Jr. | 709/203 |
| 7,289,992 B2 * | 10/2007 | Walker | 707/10 |
| 7,496,574 B2 * | 2/2009 | Walker | 707/10 |
| 7,613,698 B2 * | 11/2009 | Verma et al. | 707/204 |
| 7,644,087 B2 * | 1/2010 | Barkai et al. | 709/224 |
| 7,653,668 B1 * | 1/2010 | Shelat et al. | 709/201 |
| 7,707,195 B2 * | 4/2010 | Nettleton et al. | 707/704 |
| 2004/0030703 A1 * | 2/2004 | Bourbonnais et al. | 707/100 |
| 2004/0044705 A1 * | 3/2004 | Stager et al. | 707/204 |
| 2004/0220933 A1 * | 11/2004 | Walker | 707/8 |
| 2006/0089951 A1 * | 4/2006 | Factor et al. | 707/200 |
| 2006/0190243 A1 * | 8/2006 | Barkai et al. | 707/8 |
| 2006/0218206 A1 * | 9/2006 | Bourbonnais et al. | 707/202 |
| 2007/0061487 A1 * | 3/2007 | Moore et al. | 709/246 |
| 2007/0106667 A1 * | 5/2007 | Jain et al. | 707/8 |
| 2007/0219999 A1 * | 9/2007 | Richey et al. | 707/8 |
| 2008/0005196 A1 * | 1/2008 | Beck | 707/203 |

* cited by examiner

SYSTEM AND METHOD FOR WRITING DATA DEPENDENT UPON MULTIPLE READS IN A DISTRIBUTED DATABASE

FIELD OF THE INVENTION

The invention relates generally to computer systems, and more particularly to an improved system and method for writing data dependent upon multiple reads in a distributed database.

BACKGROUND OF THE INVENTION

Databases offer various transaction types to provide data consistency for concurrent data access by multiple processes. The strongest transaction types in widespread use provide the following well-known "ACID" properties to describe the impact of one transaction T: atomicity, consistency, isolation, and durability. The property of atomicity requires that, if T takes multiple actions, the end result is either that they all happen, or that none of them happen. The property of consistency requires that, if the database is in a consistent state when T begins, it will be in a consistent state when T ends. The property of isolation requires that other transactions see either none, or all, of T's actions. In other words, each transaction operates as if it were the only client accessing the system, even though in reality this is not the case. The property of durability requires that T's actions, once committed, remain in effect despite system failures.

However, it is difficult to provide these guarantees in a large scale, replicated, distributed database. Typical mechanisms for providing the ACID properties include a log manager and a lock manager. However, a scalable lock manager is difficult to implement in a large scale distributed database that is replicated. For example, database systems usually provide transactional consistency by ensuring serializability of semantic operations on data in a distributed database. In general, each machine in a distributed database system may request and obtain locks to data records and indexes to those records while the data is updated. Once the data and the indexes are updated, the locks may be released. Although this approach may provide strong consistency of data in primary data tables and indexes in a replicated distributed database system, these operations are expensive to execute and impedes scalability. Similarly, a distributed consensus protocol such as two-phase-commit may be implemented but this operation is also expensive to execute. It is for these reasons that typical distributed databases such as Oracle RAC and DB2 often scale to only tens or maybe hundreds of servers.

In order to scale to thousands of servers, a weak consistency model may be used. Unfortunately weak consistency models typically provide isolation guarantees for the simplest of transaction types that just read and write a single record. Often applications want to execute atomic, consistent, isolated and durable transactions that touch multiple records. Thus, weak consistency models fail to provide isolation guarantees for transactions that may include multiple records.

What is needed is a way to implement consistency guarantees for database transactions that read multiple records to achieve serializability and scalability.

SUMMARY OF THE INVENTION

The present invention provides a system and method for writing data dependent upon multiple reads in a distributed database. A transaction type for writing a data record dependent upon multiple data records read may be provided for use by a client machine. A client may read several data records and may then send a request to a database server to perform a transaction to write a data record dependent upon multiple data records read. In an embodiment, the client may specify that the write request is a transaction dependent upon several data records read, and the client may provide a sequence number for each of the data records upon which the write depends.

A database server may receive the request specifying a transaction to write a data record dependent upon multiple data records read and may perform the transaction by latching a master data record to be written and validating the data records the write depends upon. In an embodiment, the database server may first obtain a latch on the current copy of the data record to be written. For example, a latch may be obtained on a designated master copy of the record. Once a latch may be obtained on the single data record, the multiple data records read may be validated, for instance, by verifying the multiple data records are current versions of the data records stored in the distributed database. After validating the data records the write depends upon, the single data record may be written and the local lock on the single data record may be released. An acknowledgment may be sent to the client indicating the transaction succeeded. If the validation fails, the database server may abort the transaction and send a message to the client that the transaction failed.

Thus, the present invention may provide a transaction for writing data dependent upon multiple reads in a distributed database. Data intensive applications may use this transaction type in large scale distributed database systems to provide stronger consistency without significantly degrading performance and scalability.

Other advantages will become apparent from the following detailed description when taken in conjunction with the drawings, in which:

DETAILED DESCRIPTION

Exemplary Operating Environment

Figure 1:
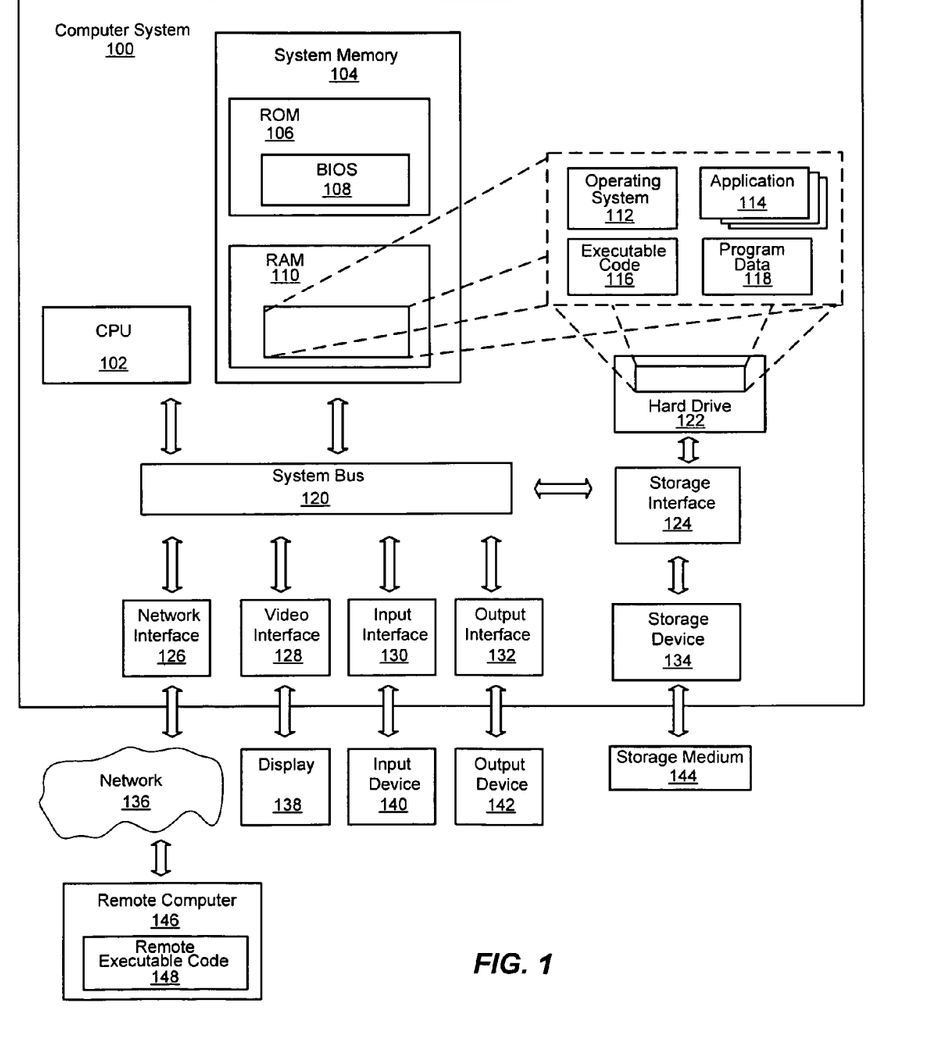
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, non-volatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Writing Data Dependent Upon Multiple Data Reads in a Distributed Database

The present invention is generally directed towards a system and method for writing data dependent upon multiple data reads in a distributed database. A transaction type for writing a data record dependent upon multiple data records read may be provided for stronger consistency during concurrent execution of transactions in a distributed database system that may provide only weak consistency. Although the transaction type may not provide full ACID guarantees, a distributed validation scheme is implemented that may guarantee "serializability" of transactions concurrently executing to provide stronger consistency where weak consistency is insufficient. To do so, A client may send multiple requests to read data in a distributed database and may then send a request to perform a transaction to write a single data record dependent upon reading multiple data records. A database server in a distributed database system may apply the transaction by latching a master data record to be written and validating the data records the write depends upon. If the validation fails, the database server may abort the transaction.

As will be seen, data intensive applications may use this transaction type in large scale distributed database systems to provide stronger consistency without significantly degrading performance and scalability of a large-scale distributed database. As will be understood, the various block diagrams, flow charts and scenarios described herein are only examples, and there are many other scenarios to which the present invention will apply.

Figure 2:
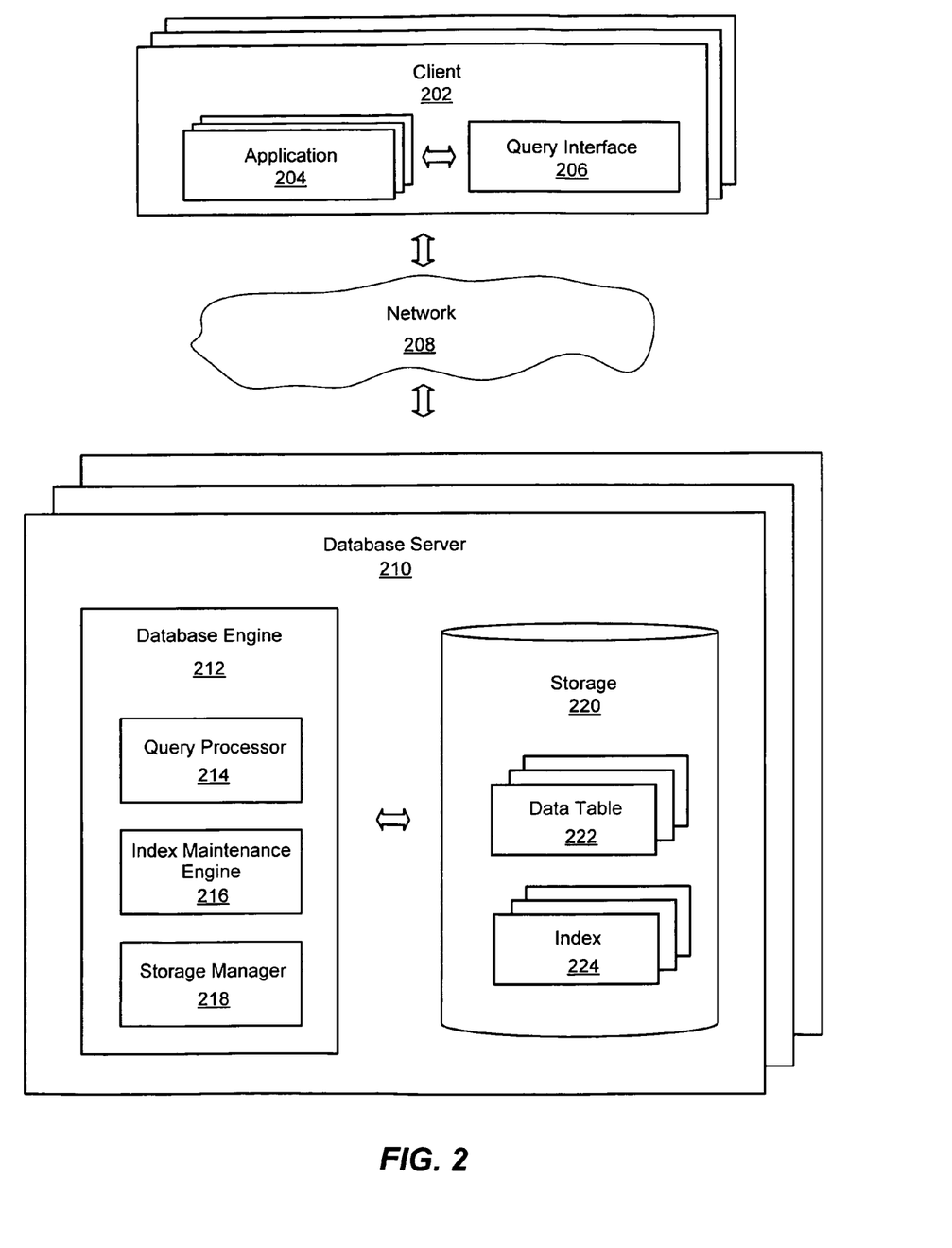
FIG. 2 is a block diagram generally representing an exemplary architecture of system components for writing data dependent upon multiple data reads in a distributed database, in accordance with an aspect of the present invention.

Turning to FIG. 2 of the drawings, there is shown a block diagram generally representing an exemplary architecture of system components for writing data dependent upon multiple data reads in a distributed database. Those skilled in the art will appreciate that the functionality implemented within the blocks illustrated in the diagram may be implemented as separate components or the functionality of several or all of the blocks may be implemented within a single component. For example, the functionality for the storage manager 218 on the database server 210 may be implemented as a separate component from the database engine 212. Or the functionality for the storage manager 218 may be included in the same component as the database engine 212 as shown. Moreover, those skilled in the art will appreciate that the functionality implemented within the blocks illustrated in the diagram may be executed on a single computer or distributed across a plurality of computers for execution.

In various embodiments, several networked client computers 202 may be operably coupled to one or more database servers 210 by a network 208. Each client computer 202 may be a computer such as computer system 100 of FIG. 1. The network 208 may be any type of network such as a local area network (LAN), a wide area network (WAN), or other type of network. An application 204 may execute on the client 202 and may include functionality for invoking a query interface 206 for sending a database query to a database server 210 for processing the database query. The application 204 may invoke the query interface 206 for reading data from or writing data to a data table 222 of a distributed database. In general, the application 204 and the query interface 206 may be any type of interpreted or executable software code such as a kernel component, an application program, a script, a linked library, an object with methods, and so forth.

The database servers 210 may be any type of computer system or computing device such as computer system 100 of FIG. 1. The database servers 210 may represent a large distributed database system of operably coupled database servers. In general, each database server 210 may provide services for performing semantic operations on data in the database 220 and may use lower-level file system services in carrying out these semantic operations. Each database server 210 may include a database engine 212 which may be responsible for communicating with a client 202, communicating with the database servers 210 to satisfy client requests, accessing the database 220, and processing database queries. The database engine 212 may include query services 214 for processing received queries including reading data from and writing data to the data tables 222 in the database 220, an index maintenance engine 216 for updating indexes 224 to data in the database 220, and a storage manager 218 for reading data from the database 220 and writing data to the database 220. Each of these modules may also be any type of executable software code such as a kernel component, an application program, a linked library, an object with methods, or other type of executable software code.

There are many applications which may use the present invention for writing data dependent upon multiple data reads in a distributed database. Data mining and online applications are examples among these many applications. These data intensive applications may have several uses for a transaction type to write data dependent upon multiple data reads in a distributed database. This transaction type could be used to aggregate the information from multiple records into a single record. For example, in a database with questions and answers, this transaction type could be used to count or otherwise aggregate all the records representing answers for the same question, and write the resulting count or aggregate into the record for the question. This transaction type may also be useful as a building block for other, even more complex transaction types.

For such data intensive applications, scalability can be more important than strong consistency. Thus, an application may be given a weaker set of guarantees than ACID, in return for a system that can scale to thousands or tens of thousands of servers. For example, one form of weak consistency is eventual consistency: records in different copies of the database may be temporarily inconsistent, but if updates to the database stopped, the different copies would eventually become consistent. Another form of weak consistency is a consistent history model where different copies are never inconsistent. Instead, all copies move through the same consistent history, although different copies may temporarily be at different points in this history.

In an embodiment of a distributed database system for supporting a transaction type to write data dependent upon multiple data reads, the database servers may be configured into clusters of servers with the data tables and indexes replicated in each cluster. In a clustered configuration, the database is partitioned across multiple servers so that different records are stored on different servers. Moreover, the database may be replicated so that an entire data table is copied to multiple clusters. This replication enhances both performance by having a nearby copy of the table to reduce latency for database clients and reliability by having multiple copies to provide fault tolerance.

To ensure consistency, the distributed database system may also feature a data mastering scheme. In an embodiment, one copy of the data may be designated as the master, and all updates are applied at the master before being replicated to other copies. In various embodiments, the granularity of mastership could be for a table, a partition of a table, or a record. For example, mastership of a partition of a table may be used when data is inserted or deleted, and once a record exists, record-level mastership may be used to synchronize updates to the record. The mastership scheme sequences all insert, update, and delete events on a record into a single, consistent history for the record. This history may be consistent for each replica.

A mastership scheme may allow different guarantees for reading data from a table. An application can accept "read any" which means that any, possibly out-of-date, version of a record is an acceptable result. Thus a nearby but slightly stale replica of the record is acceptable. An application can request "read-up-to-date", which means that the most up-to-date copy of the record, available at the record master replica, must be used. Another possible guarantee is "critical read," which is stronger than "read any" but weaker than "read-up-to-date." In critical read, a client who has previously written a record must see a version that is at least as new as the version produced by the client's write. Accordingly, if a client writes a record, subsequent reads should see a record which reflects the changes. A fourth possible guarantee is "read forward," which is again stronger than "read any" and weaker than "read-up-to-date." If a client reads a record, and then reads the same record again, under the read-forward guarantee the second version read should be no older than the first version read. In other words, readers always perceive records moving forward in time, or possibly standing still, but not moving backwards. In an embodiment, one copy of the data may be designated as the master, and all updates are applied at the master before being replicated to other copies. Each master record may be assigned to a particular cluster and a data table in a cluster may include a mix of both master records and non-master records. By sequencing all insert, update, and delete events on a record into a single, consistent history for the record, each replica of the records moves through a consistent timeline using the data mastership scheme. And it is possible to verify points in this timeline using a sequence number mechanism. In particular, when reading data from a table in response to a "read any" or a "read-up-to date" for instance, the sequence number identifying the version of the record copy may be obtained. Later, if the record may be read again, the sequence number obtained in the second read may be compared to that obtained in the first read to see if the record has changed. Similarly, a write request can specify that the write only succeed if the sequence number of the most up to date copy of the record is a given value; this may allow an application to read the most up to date copy of the record, and then update the record if and only if the record has not been changed in the interim between the read and the write.

Figure 3:
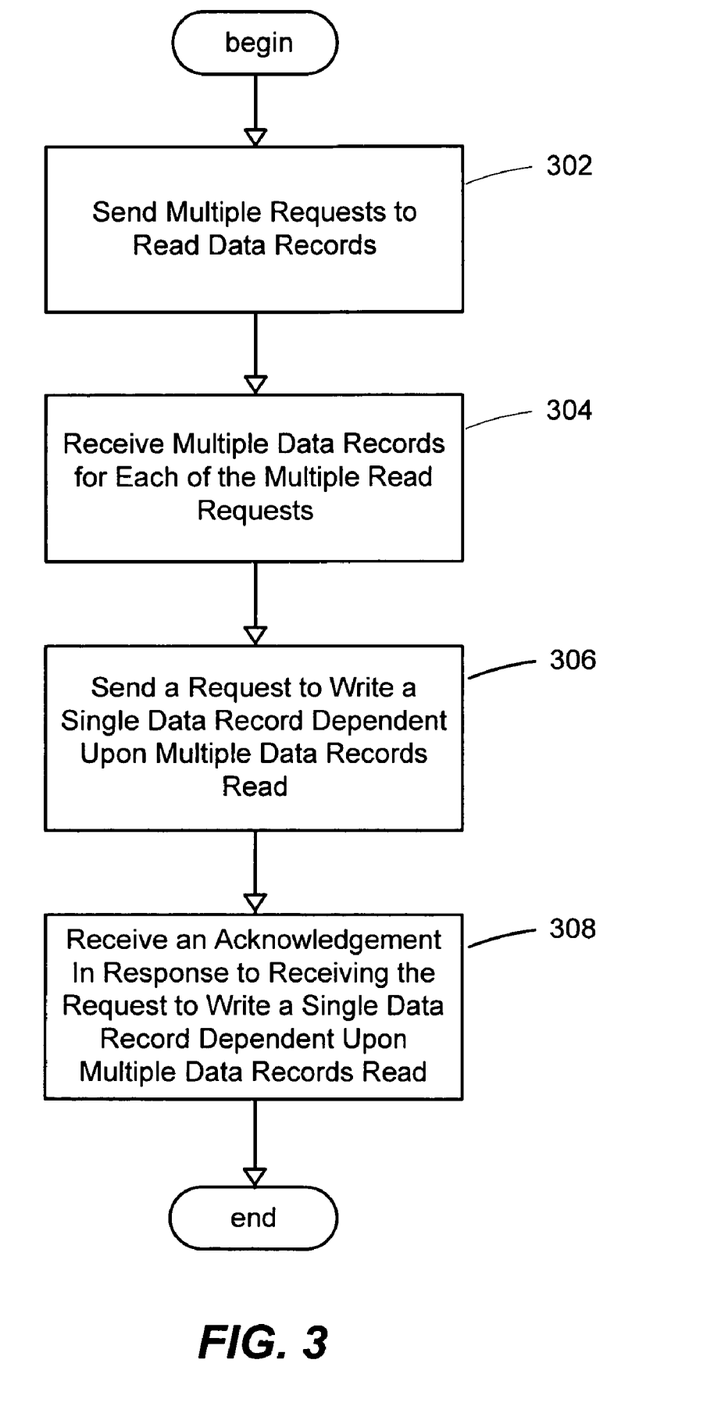
FIG. 3 is a flowchart generally representing the steps undertaken in one embodiment on a client for writing data dependent upon multiple data reads in a distributed database, in accordance with an aspect of the present invention.

FIG. 3 presents a flowchart for generally representing the steps undertaken in one embodiment on a client for writing data dependent upon multiple data reads in a distributed database. At step 302, multiple requests may be sent from an application on a client to read data in a distributed database. For example, an application may invoke a query interface multiple times for sending a request to read a data record in a distributed database, and the request may then be sent by the query interface to a database server for processing. At step 304, a data record may be received for each of the multiple data read requests. An application may note the sequence number for each of the data records received.

An application may then send a request to write a single data record dependent upon reading multiple data records at step 306. In an embodiment, the request to write a single data record may include a list of the dependent data records read, including a sequence number of the version for each data record read. An application can accordingly specify that the write is a "read-many-write-one" transaction and supply the identifier and sequence number of each of the data records that the write is dependent upon. At step 308, an acknowledgement may be received in response to receiving the request to write a single data record dependent upon reading multiple data records.

Figure 4:
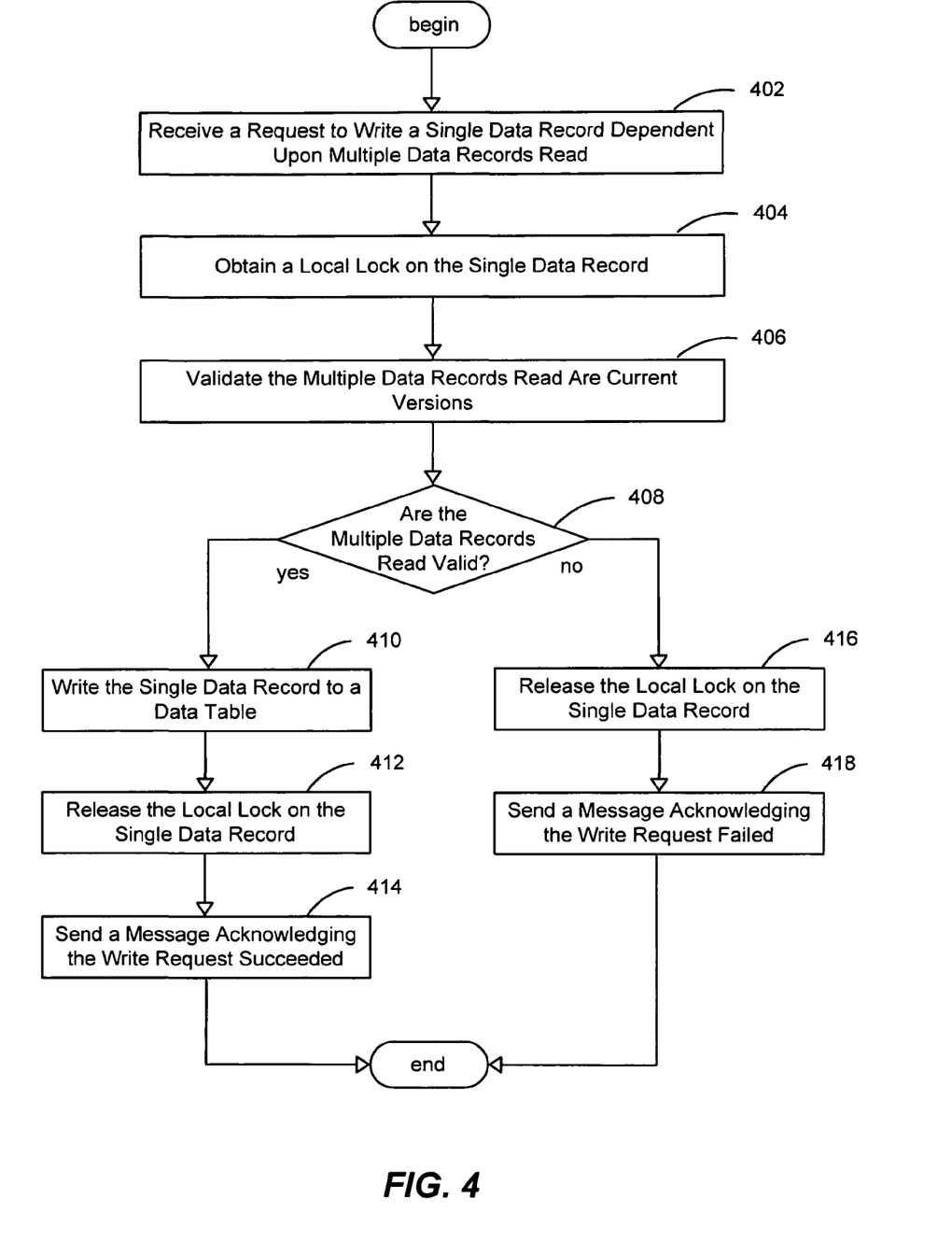
FIG. 4 is a flowchart generally representing the steps undertaken in one embodiment on a server for writing data dependent upon multiple data reads in a distributed database, in accordance with an aspect of the present invention.

FIG. 4 presents a flowchart for generally representing the steps undertaken in one embodiment on a server for writing data dependent upon multiple data reads in a distributed database. At step 402, a request may be received to write a single data record dependent upon multiple data records read. In an embodiment, a list of the multiple data records read may be included in the request. For example, each data record read, including a sequence number of the data record, may be sent as part of the request. In general, the server may apply the write if and only if all the data records listed are current sequence numbers of the data records. In order to verify that the data records listed have the current sequence numbers, the server may first obtain a latch on the most up-to-date copy of the record to be written. For example, a latch may be obtained on a designated master copy of the record. A latch as used herein means a local lock on one copy of the record. Such a local lock is typically cheaper to obtain and maintain than a global lock.

Accordingly, a local lock may be obtained on the single data record at step 404. In an embodiment, the local lock may be obtained for the data record on a database server that stores the master data record. Once a local lock may be obtained on the single data record, the multiple data records read may be validated at step 406, for instance, by verifying the multiple data records are current versions of the master data records stored in the distributed database. The steps for validating the multiple data records read are described in detail in conjunction with FIG. 5 below.

If it may then be determined at step 408 that the multiple data records received are valid, then the single data record may be written to the data table at step 410. In an embodiment, the query processor may send a write request to a storage manager to write the data record to the data table in storage. At step 412, the local lock may be released on the single data record. And a message may be sent at step 414 acknowledging that the transaction for write request succeeded. Otherwise, if it may then be determined at step 408 that the multiple data records received are invalid, then the local lock may be released on the single data record at step 416, and a message may be sent at step 418 acknowledging that the transaction for write request failed.

Figure 5:
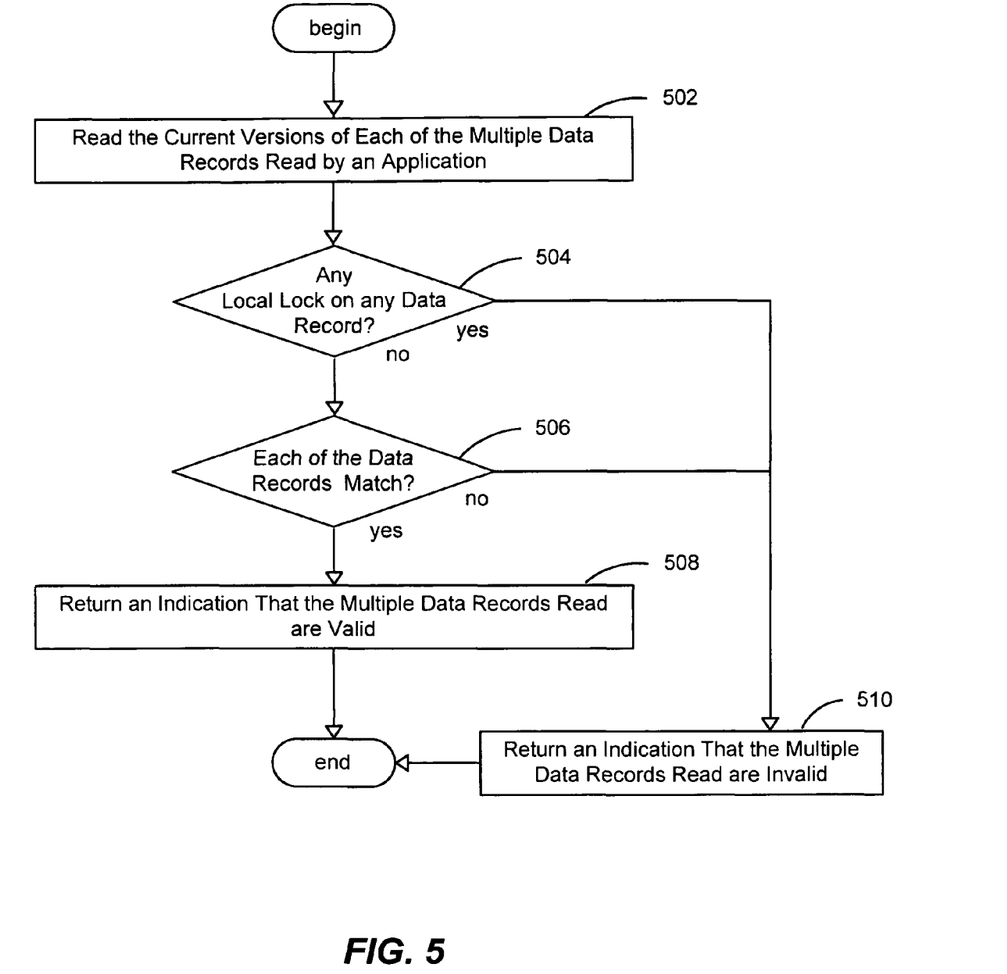
FIG. 5 is a flowchart generally representing the steps undertaken in one embodiment for verifying the multiple data records read are valid, in accordance with an aspect of the present invention.

FIG. 5 presents a flowchart for generally representing the steps undertaken in one embodiment for verifying the multiple data records read are valid. At step 502, the current versions of each of the multiple data records received in the request from an application may be read from the distributed database. In an embodiment the most recent version may be identifiable by a per-primary-record sequence number that is stored in the primary table. For example, a read request for the designated master record may be sent to a database server that stores the master data record. If there is currently a latch on the designated master record, the read will fail.

At step 504, it may be determine whether there may be a local lock on any of the multiple data records read from the distributed database. If may be determined that there is a local lock on any of the multiple data records read from the distributed database, then an indication may be returned at step 510 that the multiple data records read are invalid. Otherwise, if it may be determined that there is not a local lock on any of the multiple data records read from the distributed database, then it may be determined at step 506 whether each of the multiple data records received in the request from an application are current versions of the data records in the distributed database. In an embodiment, the sequence number obtained during the read for each data record may be verified that it matches the sequence number supplied in the request. If it may be determined that each of the multiple data records received in the request from an application are not current versions of the data records in the distributed database, then an indication may be returned at step 510 that the multiple data records read are invalid.

Otherwise, if it may be determined that each of the multiple data records received in the request from an application are current versions of the data records in the distributed database, then an indication may be returned at step 508 that the multiple data records read are valid.

Advantageously, the present invention may avoid global locking of data under the assumption that most transactions do not conflict. Only when a conflict is detected does the system need to take action to ensure consistency. In particular, a distributed validation scheme is implemented that may guarantee "serializability". Serializability means that operations from different transactions have been interleaved in a way that has the same effect as if the transactions had proceeded serially. Thus, the transactions appear to execute serially, even though the transactions are executing concurrently. The order of latching records ensures that transactions execute serially in the order that the records were latched. Any transaction which reads a latched record as part of its validation phase will be aborted, and any transaction which reads a previously latched record which has been updated will also be aborted. Thus, the only possible transactions that may execute are ones in which the operations are serializable.

Without significantly impairing the scalability of the system, the present invention may provide a transaction type with stronger consistency in a distributed database system that may provide only weak concurrency. Importantly, the cost of executing such a transaction remains relatively low because a local lock may be limited to the most up to date copy of a master record. This avoids using mechanisms with greater overhead and higher transactional costs such as using a global lock manager or the traditional two-phase-commit.

As can be seen from the foregoing detailed description, the present invention provides an improved system and method for writing data dependent upon multiple data reads in a distributed database. A client may send multiple requests to read data in a distributed database and may then send a request to perform a transaction to write a single data record dependent upon reading multiple data records. A database server in a distributed database system may apply the transaction by latching a data record to be written and validating the data records the write depends upon. If the validation fails, the database server may abort the transaction. Data intensive applications may use this transaction type in large scale distributed database systems to provide stronger consistency without significantly degrading performance and scalability. As a result, the system and method provide significant advantages and benefits needed in contemporary computing, and more particularly in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A distributed computer system for updating data tables, comprising:

a plurality of database servers operably coupled to provide a distributed database stored across the plurality of database servers;

a query processor operably coupled to at least one of the plurality of database servers for performing a transaction to update data by writing a single data record dependent upon a plurality of data records previously read from the distributed database; and a storage manager operably coupled to the query processor for writing the single data record to a data table in the distributed database, and an information storage device comprising instructions for validating that the plurality of data records received are current versions of the plurality of data records in the distributed database; and writing a single data record dependent upon a plurality of data records previously read from the distributed database comprises determining whether the dependent data records are valid and writing the single data record based on whether the dependent data records are valid;

wherein validating that the plurality of data records received are current versions of the plurality of data records comprises:

reading the current versions of the plurality of data records from the distributed database; and determining whether there is any local lock on any of the current versions of the plurality of data records.

2. The system of claim 1 further comprising a plurality of client computers operably coupled to the plurality of database servers for sending a request to performing the transaction to update data by writing the single data record dependent upon the plurality of data records previously read from the distributed database.

3. A computer storage medium having computer executable components comprising the system of claim 1.

4. A computer-implemented method for updating data tables, comprising:

sending a plurality of requests to read data records in a distributed database;

receiving a plurality of data records read from a distributed database;

sending a request to perform a transaction to write a single data record dependent upon a plurality of data records read from the distributed database; and receiving an acknowledgment in response to receiving the request to perform the transaction to write the single data record dependent upon the plurality of data records read from the distributed database, wherein writing a single data record dependent upon a plurality of data records previously read from the distributed database comprises determining whether the dependent data records are valid and writing the single data record based on whether the dependent data records are valid;

validating that the plurality of data records received are current versions of the plurality of data records in the distributed database; and wherein validating that the plurality of data records received are current versions of the plurality of data records comprises:

reading the current versions of the plurality of data records from the distributed database; and determining whether there is any local lock on any of the current versions of the plurality of data records.

5. The method of claim 4 further comprising receiving the request to perform the transaction to write the single data record dependent upon the plurality of data records read from the distributed database.

6. The method of claim 4 further comprising obtaining a local lock on the single data record in the distributed database.

7. The method of claim 4 further comprising:

determining that the plurality of data records received are not current versions of the plurality of data records; and sending a message indicating that the transaction failed to write the single data record dependent upon the plurality of data records read from the distributed database.

8. The method of claim 4 further comprising:

determining that the plurality of data records received are current versions of the plurality of data records; and writing the single data record to a data table.

9. The method of claim 8 further comprising releasing the local lock on the single data record.

10. The method of claim 8 further comprising sending a message indicating that the transaction to write the single data record dependent upon the plurality of data records read from the distributed database succeeded.

11. The method of claim 4 further comprising determining whether each of the plurality of data records received match the current versions of the plurality of data records.

12. The method of claim 11 further comprising:

determining that there is not a local lock on any of the current version of the plurality of data records;

determining that each of the plurality of data records received match the current versions of the plurality of data records; and returning an indication that the multiple data records read are valid.

13. The method of claim 11 further comprising:

determining that there is not a local lock on any of the current version of the plurality of data records;

determining that at least one of the plurality of data records received does not match the current version of the data record; and returning an indication that the multiple data records read are invalid.

14. The method of claim 4 further comprising:

determining that there is a local lock on at least one of the current version of the plurality of data records; and returning an indication that the multiple data records read are invalid.

15. A computer storage medium having computer-executable instructions for performing the method of claim 4.

16. A distributed computer system for updating data tables, comprising:

means for receiving a request to perform a transaction to write a single data record dependent upon a plurality of data records read from a distributed database;

means for obtaining a local lock on the single data record in the distributed database;

means for validating that the plurality of data records are current versions of the plurality of data records in the distributed database; and means for sending an acknowledgment in response to receiving the request to perform the transaction to write the single data record dependent upon the plurality of data records read from the distributed database, and an information storage device comprising instructions for validating that the plurality of data records received are current versions of the plurality of data records in the distributed database; and writing a single data record dependent upon a plurality of data records previously read from the distributed database comprises determining whether the dependent data records are valid and writing the single data record based on whether the dependent data records are valid;

wherein validating that the plurality of data records received are current versions of the plurality of data records comprises:

reading the current versions of the plurality of data records from the distributed database; and determining whether there is any local lock on any of the current versions of the plurality of data records.

17. The computer system of claim 16 further comprising:

means for writing the single data record to a data table in the distributed database; and means for releasing the local lock on the single data record in the distributed database.

18. The computer system of claim 16 further comprising:

means for sending a plurality of requests to read the plurality of data records in the distributed database;

means for receiving the plurality of data records read from the distributed database; means for sending the request to perform the transaction to write the single data record dependent upon the plurality of data records read from the distributed database; and means for receiving an acknowledgment in response to receiving the request to perform the transaction to write the single data record dependent upon the plurality of data records read from the distributed database.

* * * * *